United States Patent
Maistre et al.

(10) Patent No.: US 7,107,126 B2
(45) Date of Patent: Sep. 12, 2006

(54) METHOD OF DETERMINING A SHADING AND VENTILATION POSITION FOR A ROLLER BAND

(75) Inventors: Valérie Maistre, Thyez (FR); Claude Desbiolles, Eteaux (FR); Alain Hubault, Magland (FR); Patrick Mercier, Marignier (FR)

(73) Assignee: Somfy SAS, Cluses (FR)

( * ) Notice: Subject to any disclaimer, the term of this patent is extended or adjusted under 35 U.S.C. 154(b) by 0 days.

(21) Appl. No.: 10/507,707

(22) PCT Filed: Mar. 25, 2003

(86) PCT No.: PCT/IB03/01083

§ 371 (c)(1),
(2), (4) Date: Sep. 14, 2004

(87) PCT Pub. No.: WO03/081357

PCT Pub. Date: Oct. 2, 2003

(65) Prior Publication Data

US 2005/0119792 A1    Jun. 2, 2005

(30) Foreign Application Priority Data

Mar. 25, 2002  (FR) .................... 02 03668
Feb. 12, 2003  (FR) .................... 03 01675

(51) Int. Cl.
*G01M 1/38*    (2006.01)
*E05F 15/20*   (2006.01)

(52) U.S. Cl. .................... 700/275; 160/1; 160/310

(58) Field of Classification Search ................ 700/275; 160/1, 310
See application file for complete search history.

(56) References Cited

U.S. PATENT DOCUMENTS

| | | | | |
|---|---|---|---|---|
| 6,119,759 A | * | 9/2000 | Assaad | 160/310 |
| 2005/0067989 A1 | * | 3/2005 | Lagarde et al. | 318/466 |
| 2005/0146299 A1 | * | 7/2005 | Mommaerts | 318/445 |
| 2005/0183833 A1 | * | 8/2005 | Vasquez | 160/133 |

FOREIGN PATENT DOCUMENTS

| | | |
|---|---|---|
| EP | 0 426 577 A1 | 5/1991 |
| EP | 0 574 637 A1 | 12/1993 |
| EP | 0 784 146 A1 | 7/1997 |

* cited by examiner

*Primary Examiner*—Jayprakash N. Gandhi
*Assistant Examiner*—Sheela S. Rao
(74) *Attorney, Agent, or Firm*—Frommer Lawrence & Haug LLP; Ronald R. Santucci

(57) ABSTRACT

A method and apparatus for determining a shading and ventilation position of a a roller blind. The method including steps of identifying the final slat position in which the bottom slat is at the limit of contact with the bottom end stop of the blind, assigning to this final slat position a data defining the position, and calculating a shading and ventilation position data defining the shading and ventilation position from the data of the final slat position. The method also includes steps of storing the shading and ventilation position data in a shading and ventilation position memory. The method enabling storing of the best shading and ventilation position without necessitating the storage in memory at the site of manufacture.

7 Claims, 4 Drawing Sheets

METHOD OF DETERMINING A SHADING AND VENTILATION POSITION FOR A ROLLER BAND

FIELD OF THE INVENTION

The invention relates to a method of determining a shading and ventilation venting position in a control system of an actuator which is used to move a sun-protection, privacy or closure device. It also concerns a device for controlling an actuator for moving a sun-protection, privacy or closure device control device.

BACKGROUND OF THE INVENTION

It is known practice with control devices for roller blinds to determine an intermediate position of the roller blind, termed the shading and ventilation position, which can be stored in memory by the installer or by the user.

In the case of a roller blind with perforated slats, the shading and ventilation position is such that the shutter curtain of the blind is almost fully unwound, the slats remaining separated from each other. In this separated position of the slats, elongate holes can be seen in the top of each slat. These are normally hidden when the slats are resting on top of each other, as shown in FIG. 1. Such a situation provides the room with privacy from the exterior and provides attenuated lighting, while allowing ventilation if the windows are not shut.

This position typically corresponds to 80–90% of the movement of the winding drum of the blind required to close the blind. However, this position depends very much on the type of roller blind slats used in the construction of the shutter curtain.

EP 0 426 577 discloses just such a means of storing in memory an intermediate position and executing an instruction designed to move a device to such a position. In that patent, a sensor is used to identify the position of the winding tube driven by the actuator. In all cases it is up to the installer or user to store the intermediate position in memory for the first time. This is done with the aid of a switching device comprising control keys.

Patent EP 0 574 637 discloses ways of recording and executing a command to enable an intermediate position to be reached in the case of an actuator without a position sensor. Here it is the duration of the operation which is analyzed. An intermediate position is therefore expressed as a percentage of the total travel between the two extreme positions.

The disclosed devices have a drawback in that the intermediate or comfortable position must necessarily be set either by the installer or by the user. Furthermore, if this setting is not carried out, the user may remain unaware of the existence of this shading and ventilation position function.

In Application FR 02 03668, it was suggested that devices be produced comprising an intermediate position predefined by the manufacturer. In the case of a maker of roller blinds who knows the type of slat of each device, it is possible to determine this intermediate position information, for example as a percentage of the total travel. The main advantage of this prestored and predefined value is that it enables the installer to present the function to the customer and leave its precise adjustment to the customer, at the customer's convenience. It is not therefore necessary for the intermediate position to correspond to the best shading and ventilation position.

This device has a drawback—it complicates production, since the type of slat used in the roller blind must first be determined, and then this intermediate-position data must be stored in memory.

SUMMARY OF THE INVENTION

The object of the invention is to provide a method of determining a shading and ventilation position that improves on the known methods of the prior art and mitigates the abovementioned drawbacks. In particular, the invention provides a method of automatically determining the best shading and ventilation position without storing it in memory at the site of the manufacturer.

The method according to the invention comprises the following steps:
   identifying, by analyzing the torque exerted on the actuator, the final slat position in which the bottom slat is at the limit of contact with the bottom end stop of the device,
   assigning to this final slat position a data defining said position,
   calculating a shading and ventilation position data defining the shading and ventilation position from the data of the final slat position, and
   storing the shading and ventilation position data in a shading and ventilation-position memory.

In this method, the addition of a value must be understood as adding a relative value which may correspond to subtracting a positive value.

The control device is characterized in that it comprises means for calculating a data defining a position in which all the perforated parts are visible.

BRIEF DESCRIPTION OF THE DRAWINGS

The attached drawing shows by way of example one embodiment of the method according to the invention.

DETAILED DESCRIPTION OF THE EMBODIMENTS

Figure 1:
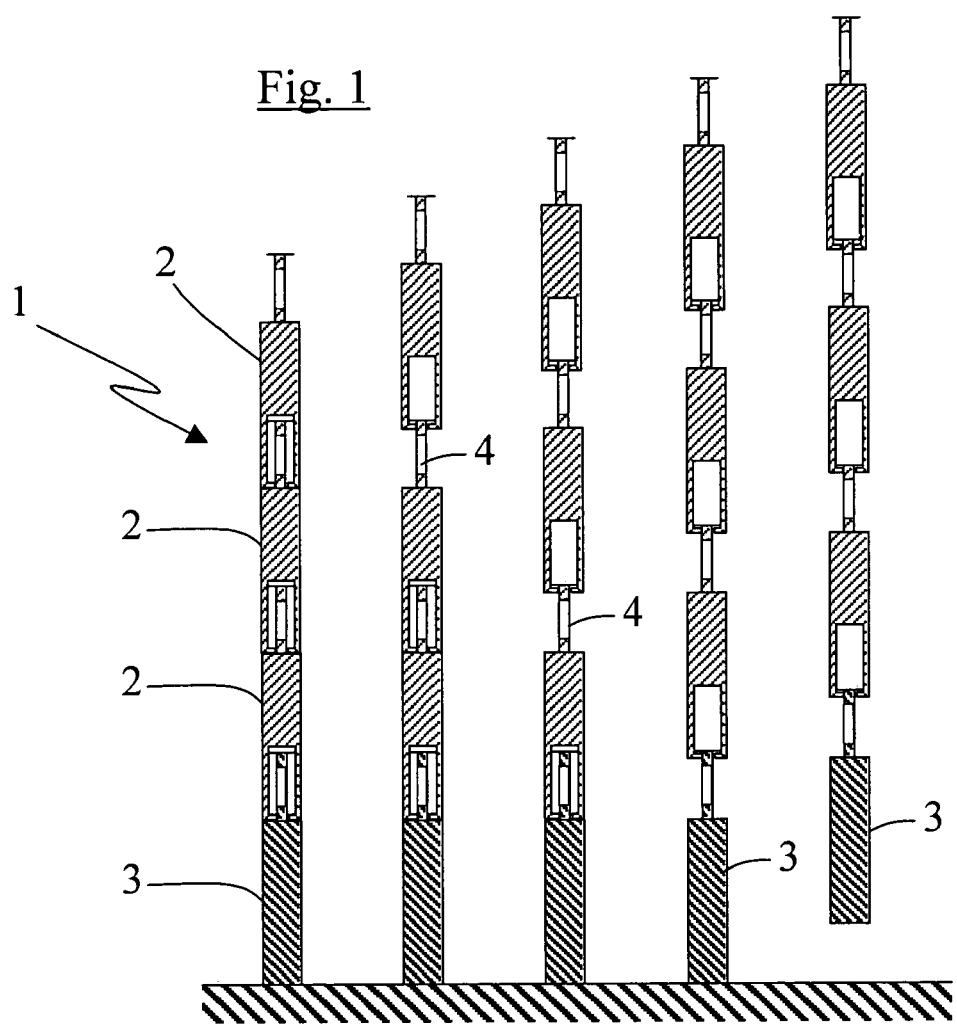
FIG. 1 is a diagram showing a sequence of lifting a roller blind from its closed position.

The roller blind 1 shown in FIG. 1 is made up of several slats 2, 3 connected to each other. The sequence of lifting this roller blind 1 is shown from left to right, beginning with its closed position. In this first position the slats 2, 3 rest on top of each other. The torque exerted by the blind on its winding drum (not shown) is therefore zero.

In the next three views, the lower slats are pulled up by the higher slats. This uncovers elongate holes in the slat parts 4 designed to connect the slats together. Last of all, in the right-hand view, the bottom slat 3 has left its bottom position, so that the elongate holes are uncovered between all the slats 2, 3.

In this position, the weight of the roller blind suspended from the winding drum is at maximum. However, the torque exerted on the drum is not necessarily at maximum because the torque exerted on the winding drum also depends on the winding radius.

Figure 2:
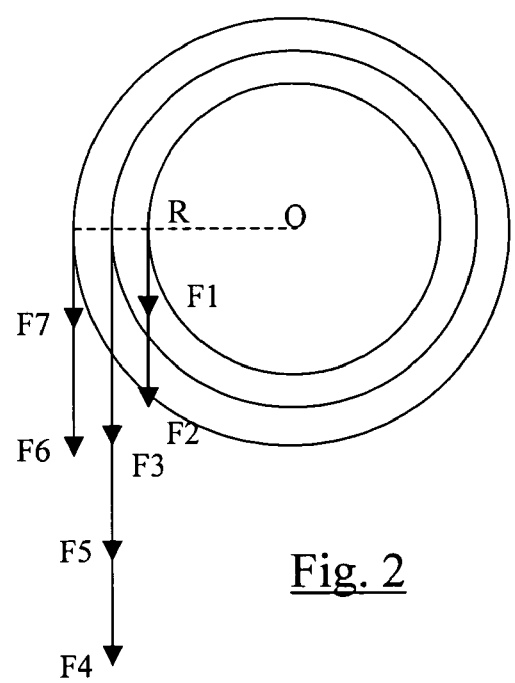
FIG. 2 is a diagrammatic view in cross section of the winding drum of a roller blind and of the different mechanical forces applied to it.

As shown in a simplified manner in FIG. 2, the mass suspended increases, causing an increasing effort to be applied to the small radius, that is first F1, then F2. Given a constant angular velocity of the winding drum, the torque increases in an approximately linear and rapid fashion. This is because a slat has only to rise by the height of one perforation before it is put in the next slat, which means the suspended mass is increased.

When the suspended mass corresponds to a weight F3, it is assumed that the drum has wound through one complete revolution, at which point winding begins to occur at the second diameter. Because of this change to a new winding diameter, the variation of torque that occurs when a slat first begins to rise is greater.

As soon as the bottom slat begins to rise, the suspended mass reaches a maximum. F4 denotes the new value of the weight of the suspended shutter curtain. This weight then decreases as winding continues, passing through F5, then F6 and F7 on a larger diameter.

It will be noticed that, until the last slat has begun to rise, the average rate of decrease of the suspended mass (due to the winding of the slats around the drum) is generally less than the average rate of increase of the suspended mass (due to the lifting of new lower slats). This is due to the fact that one complete slat has to be wound for the suspended mass to be reduced by one unit, whereas only a distance corresponding to one perforation (that is, only about a third as far) has to be wound to increase it by one unit.

Figure 3:
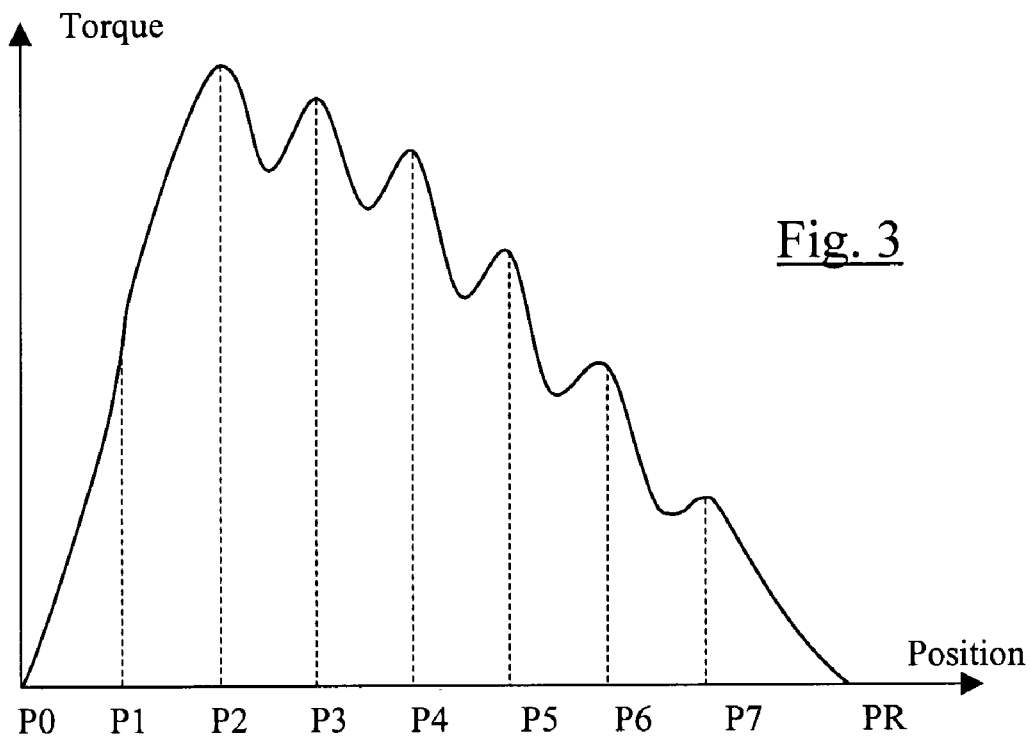
FIGS. 3 and 4 are diagrams showing the torque resisting the driving of the blind as a function of the angular position of the winding drum or as a function of time.

The curve, FIG. 3, is a typical example of a reading of torque against the angular position of the winding drum, in the case in which the bottom slat is not weighted. Such a curve can be obtained with the aid of a torque sensor and an angular-position sensor. An experimental reading contains much more noise, but the use of a numerical filtering algorithm removes the torque fluctuations.

In the case shown in FIG. 3, the blind takes 8 revolutions to wind up. The bottom slat here begins to rise at the end of the second revolution P2. In the generally decreasing part of the torque, each new revolution is clearly identifiable by a distinct torque increase (P3 to P7) in the opposite direction to the general decrease. In the increasing part, corresponding to the progressive opening up of the slats, the distinct torque increase corresponding to the beginning of the second revolution P1 is harder to pinpoint. It can be seen however that, from the frequency measured between the positions P3 to P7, the positions P1 and P2 can easily be identified by extrapolation if they are not very well marked.

Figure 4:
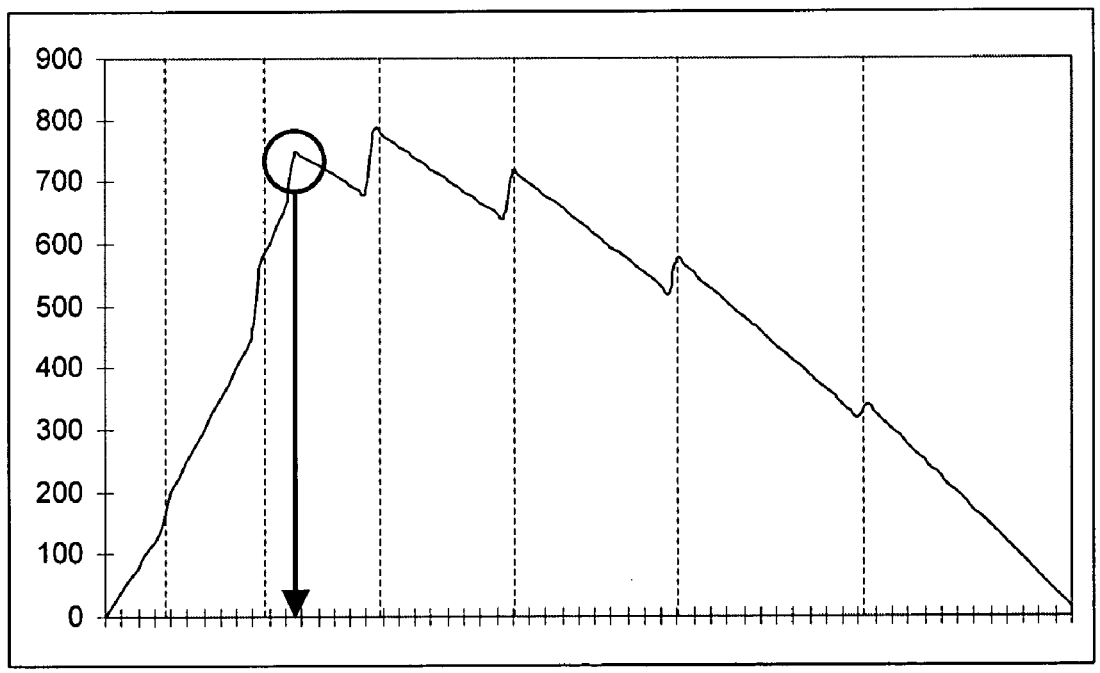

The situation is a little more complicated if, as is often the case, the bottom slat is weighted. The torque maximum does not necessarily correspond to the moment when the bottom slat first begins to rise, but may occur a little later, at the moment when the winding diameter increases. This is illustrated in FIG. 4, which now corresponds to a simulation of the torque exerted by the blind on the drum as a function of the lengths of shutter curtain wound up. The intermediate maximum, identified by an arrow, can be made out very easily. This is the torque variation due to the bottom slat, which is weighted, beginning to rise. There is therefore no ambiguity about identifying the bottom slat, provided it is weighted.

The shading and ventilation position PIA is derived from the final slat position PLF in which the bottom slat is at the limit of contact with a bottom end stop. This shading and ventilation position corresponds to the drum being wound up slightly less than for the PLF position.

A data dPIA defining the position PIA can therefore be deduced from a data dPLF defining the position PLF by the equation $$dPIA = dPLF - 20,$$

if the data are winding angles of the drum in degrees and if the position PIA is 20° before the position PLF.

The data defining the two positions can also be related by a coefficient of proportionality, for example:

$$dPIA = 0.95 \times dPLF.$$

If the torque detection is very sensitive, or if no margin is taken, it is possible to simplify thus:

$$dPIA = dPLF.$$

Figure 5:
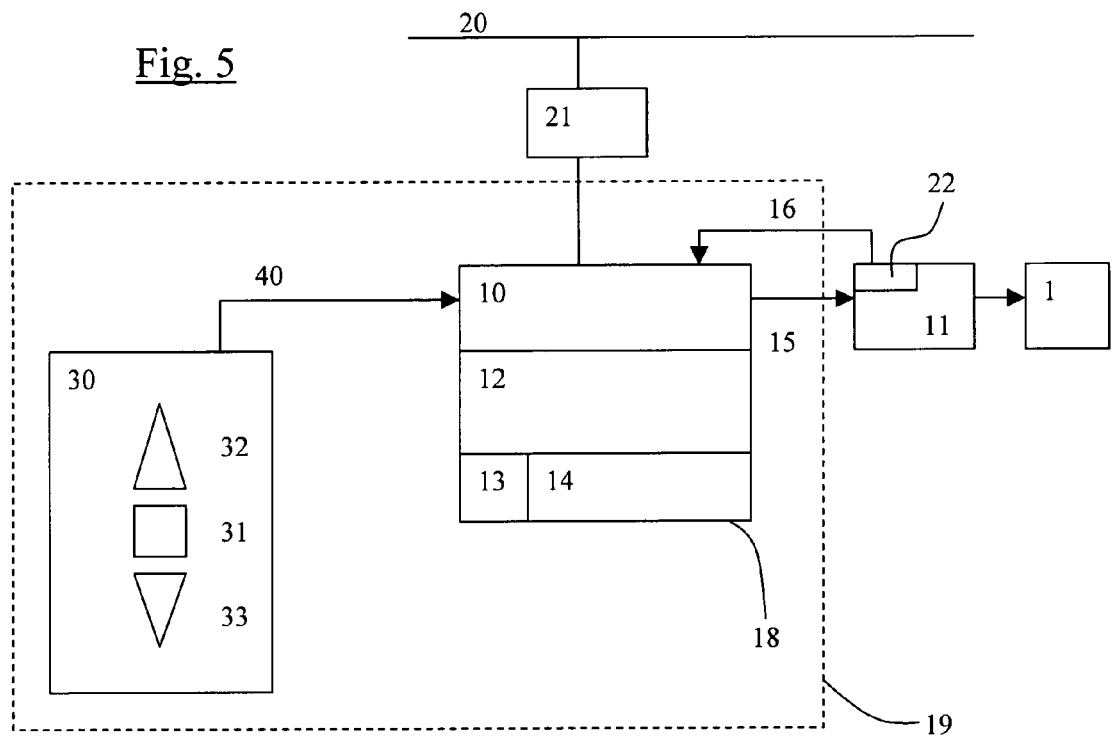
FIG. 5 is a diagram of a control device for carrying out the method according to the invention.

The control device 19 shown in FIG. 5 which can be used to carry out the method according to the invention comprises a control unit 18 comprising a microprocessor 10 able of running programs contained in a memory 12. The control unit 18 controls an actuator 11 that drives the roller blind 1. Known to those skilled in the art, the details of the electrical connections and power relays is not shown. The arrow 15 indicates the control unit 18 has the option of acting on the actuator 11, while the arrow 16 indicates return information such as information from a torque sensor 22 to the actuator and, optionally, from an angular-position sensor for the winding tube. The torque sensor used to measure the torque is preferably situated in the actuator 11, but can also be situated somewhere else in the drive chain between the actuator and the blind. A memory area 13 is assigned to the storage of the shading and ventilation position data dPIA and a memory area 14 is assigned to the storage of an initialization algorithm comprising a program for acquiring torque and position readings and a program for calculating the shading and ventilation position data dPIA.

The control device 19 is supplied from an electricity supply 20 through a converter 21. A command transmitter 30 comprises control means represented here by three keys 31, 32 and 33. The key 31 activates a contact giving the command to move to the shading and ventilation position. The key 32 activates a contact giving a command to rise and the key 33 activates a contact giving a command to descend.

As is known in the prior art, pressing a combination of these keys or pressing one for a long time causes the command transmitter to enter a learning mode. The command transmitter is connected to the control unit by a wire link 40 or by a wireless link (infrared, radio etc) as known in the prior art. This link may be two-way, the command transmitter comprising lights or a display for acknowledging reception of transmitted commands. The command transmitter may be separate from the actuator or integrated into a single mechanical assembly.

Pressing the key 31 activates the actuator 11 until the blind reaches the shading and ventilation position which is calculated by an initialization algorithm stored in memory 14.

One advantage of the invention is that it allows an instantaneous demonstration of the function of setting the blind in the shading and ventilation position, even if the setting is not exactly that desired by the user. Having understood the effect of pressing the shading and ventilation position key, the user will therefore be inclined to use this function after first setting it to his convenience.

Figure 6:
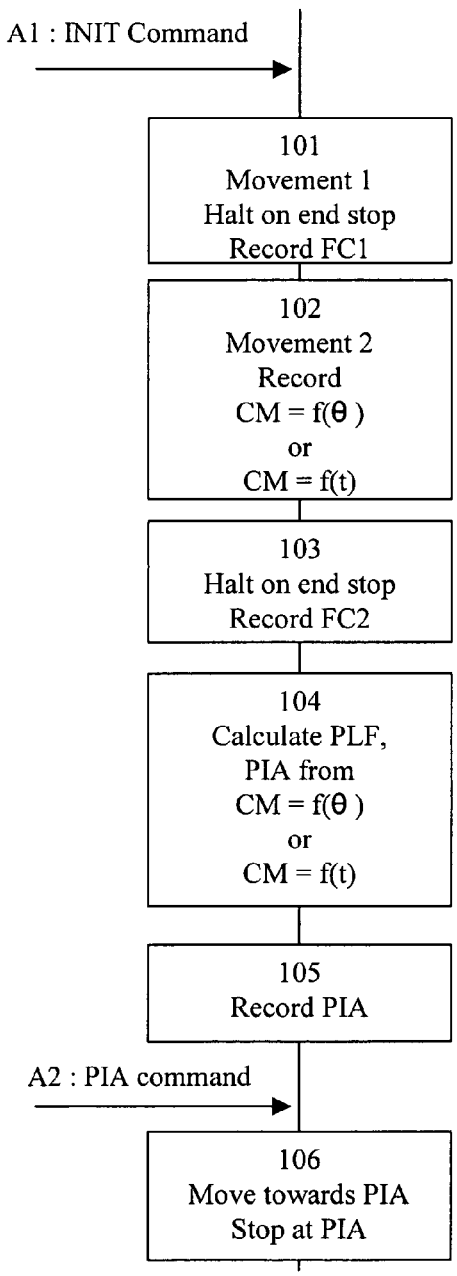
FIG. 6 is a flowchart illustrating the method according to the invention.

As shown in FIG. 6, following an action A1 by the installer, ordering the system to enter the learning mode, the blind starts, in an initial phase 101, a first movement, e.g. of descent, until it meets a bottom end stop. This end stop is detected by the torque measuring device, which stops the activator and stores in memory a first end-of-travel position FC1 or resets a timer to zero if the device does not have an angular-position sensor.

Immediately afterwards, the inner phase 102 of the actuator 11 drives the blind in the opposite direction. The torque sensor collects the torque values CM exerted on the drum, and therefore on the actuator 11, as a function of winding position or of time. This recording phase lasts, for example, until a phase 103 in which the blind is detected to have stopped on an end stop. The signal produced by the torque sensor is filtered by a low-pass filter whose cut-off frequency is preferably equal to or greater than the frequency of rotation of the winding drum so as to avoid producing a torque curve with numerous local extrema. In this phase, a second end-of-travel position FC2 is also recorded.

In the next phase 104, the data dPLF and dPIA used to define the positions PLF and PIA are calculated, as explained later.

In phase 105, the shading and ventilation position is stored in the memory 13. At the end of this phase the control device comes out of learning mode.

Following an action A2 by the user on the key 31 of the command transmitter 30, the control unit 18 receives the instructions to move the blind to the shading and ventilation position. In phase 106, in the control unit 18 determines the direction of movement and activates the actuator 11 until the blind is in the position PIA.

If the length of time the actuator has been running is used to determine the position of the blind, the positioning of the blind in the position PIA may necessitate first moving it through an end stop FC1 or FC2 in order to reset the time to zero.

This method can also be used where the roller blind or any other closure, privacy or sun-protection device does not have a top end stop. The end-of-travel positions FC1 and/or FC2 can be determined by the installer by means of the transmitter and also by programming means known in the prior art. To simplify the data processing, it is preferable for the movement between the positions FC1 and FC2 to be uninterrupted, but as described later, it is not indispensable for the invention that the movement should take place from one end-of-travel stop to the other, provided that the variations of torque in the vicinity of the position where the bottom slat is at the limit of contact with the bottom end stop are recorded, at least on either side of this position.

Figure 7:
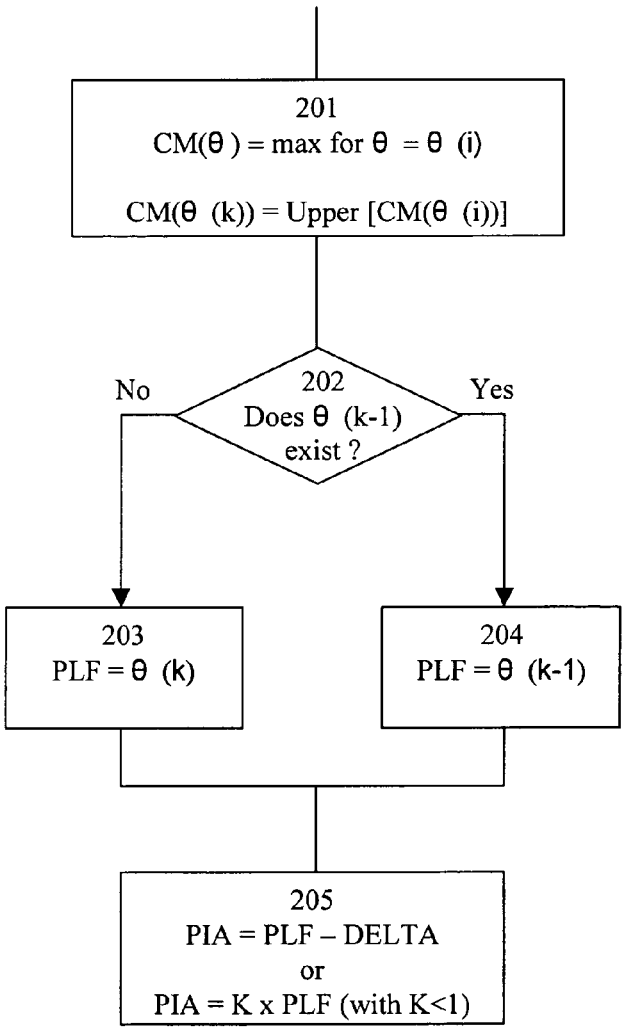
FIG. 7 is a flow chart for determining the shading and ventilation position.

The flow chart, for FIG. 7, illustrates the method of determining the positions PLF and PIA as used in phase 104 of the method described above.

In an initial sub-phase 201, all the local maxima CM(i) of the torque CM exerted on the drum during phase 102 and the corresponding positions θ(i) of the blind are retrieved from memory.

The maxima are compared in order to determine which is the highest of them CM(k) and its position θ(k).

Clearly, it is not essential to know the position of all the maxima, but it will be observed that these data make it possible to deduce the winding frequency, whether substantially constant or varying with the load in a known manner, and use this data if necessary to distinguish between a maximum due to the change of winding diameter, and a maximum due to the rising of the weighted bottom slat should these two be very close together.

In the case of well defined maxima, a simple discrimination is sufficient. This can be done via a test 202 that determines whether there is a local maximum whose position is closer to the closed position of the blind than is the position of the global maximum. The index (k−1) is assigned to the position of a local maximum situated between the closed position of the blind and the position of the global maximum torque.

If the result of this test is negative, the position PLF in which the bottom slat is at the limit of contact with the bottom end stop is defined, in sub-phase 203, as the position θ(k) of the global maximum torque.

If the result of the test is positive, the position PLF in which the bottom slat is at the limit of contact with the bottom end stop is defined in sub-phase 204 as the position θ(k−1) of the local maximum existing between the closed position of the blind and the position θ(k) of the global maximum torque.

Lastly, in sub-phase 205, the shading and ventilation position PIA is defined from the position PLF in which the bottom slat is at the limit of contact with the bottom end stop. This definition may consist in subtracting a number or applying a multiplying coefficient to the data dPLF defining the position PLF. The data defined in the positions PIA and PLF may be drum winding angles, the lengths of time for which the actuator 11 has been running from a reference position, or images of these variables.

Finally, as in the prior art, the user or installer still has the option of recording a position data defining a customized position which the users prefers. It is preferably recorded directly by overwriting the calculated value PIA in the memory 13.

The invention is carried out more easily by using a command transmitter that comprises a reduced number of keys and that facilitates the understanding of the functions. To this end, the invention proposes that the above device be implemented with a command transmitter having a keypad with three keys. The key 31 gives a command to move to the shading and ventilation position, when the actuator 11 is not running, and to stop when the actuator 11 is running.

Figure 8:
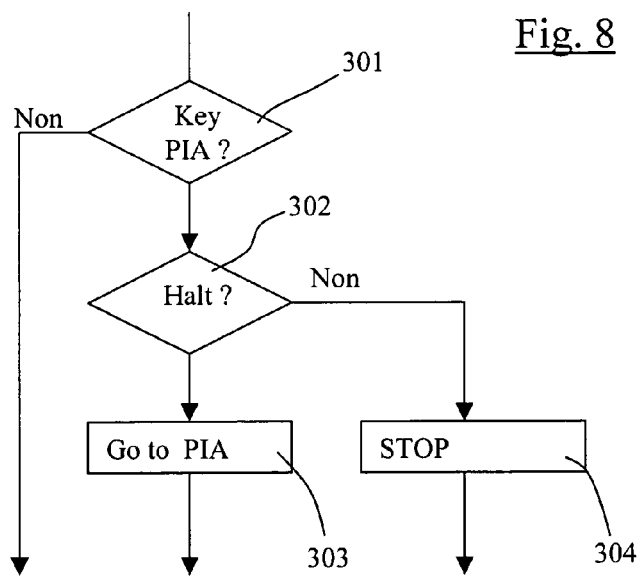
FIG. 8 is a flow chart illustrating the operation of a key for putting the blind in the shading and ventilation position.

As shown in FIG. 8, the first step 301 tests the status of the key 31. If this key is actuated, the second step 302 tests to see whether the actuator is running:

if it is running, proceed to a step 304 in which the actuator 11 is turned off, if it is not running, proceed to a step 303 in which the command transmitter sends a command telling the shutter to move to the shading and ventilation position PIA.

Consequently, the invention doubly facilitates the use of the function giving access to a shading and ventilation position, firstly by means of a method which makes this function usable in an almost optimal function, without on-site adjustment, and secondly by the use of command-transmitting means that assist a clear understanding of the functions by the use of a limited number of keys.

The invention claimed is:

1. A method of determining a shading and ventilation venting position (PIA) in a control system of an actuator (11) which is used to move a sun-protection, privacy or closure device (1) comprising stackable slats (2, 3) connected together by perforated parts (4), which method comprises the following steps: identifying, by analyzing the torque exerted on the actuator (11), the final slat position (PLF) in which the bottom slat (3) is at the limit of contact with the bottom end stop of the device (1), assigning to this final slat position (PLF) a data (dPLF) defining said position, calculating a shading and ventilation position data (dPIA) defining the shading and ventilation position (PIA) from the data (dPLF) of the final slat position (PLF), and storing the shading and ventilation position data (dPIA) in a shading and ventilation position memory (13).

2. The method as claimed in claim 1, wherein the step of "identifying, by analyzing the torque exerted on the actuator (11), the final slat position (PLF) in which the bottom slat (3) is at the limit of contact with the bottom end stop of the device (1)" comprises the following sub-steps: by means of the actuator (11), driving the device (1) at least to the vicinity of the final slat position (PLF), such that it passes through the final slat position (PLF), storing, during the preceding sub-step, the values of the torque exerted on the actuator (11) by the weight of the device (1), based on the position of the device (1), and determining the final slat position (PLF) as corresponding to the first local torque maximum encountered after leaving the completely unwound position of the device (1).

3. A method for controlling an actuator (11) making it possible to move a sun-protection, privacy or closing device (1) to a shading and ventilation position (PIA), which method includes the steps of the method as claimed in claim 1, and the following steps: activating the actuator (11) at the time of the transmission of a shading and ventilation position control command, until the device (1) occupies the position defined by the shading and ventilation position data (dPIA) stored in the shading and ventilation position memory (13).

4. The method as claimed in claim 1, wherein the data defining the shading and ventilation position (PIA) is derived from a data defining the final slat position (PLF) by multiplying it by a coefficient.

5. The method as claimed in claim 1, wherein the data defining the shading and ventilation position (PIA) is derived from a data defining the final slat position (PLF) with a mathematical law comprising an addition.

6. A device (19) for controlling an actuator (11) for moving a sun-protection, privacy or closure device (1) comprising stackable slats (2, 3) connected together by perforated parts (4) and comprising a torque sensor (22), which device comprises means (10) for calculating a data (dPIA) defining a position (PIA) in which all the perforated parts (4) are visible.

7. The device as claimed in claim 6, which device comprises a command transmitter (30) having a shading and ventilation position key (31) activating a contact that causes the actuator (11) to move the sun-protection, privacy or closure device (1) to the shading and ventilation position (PIA) if the actuator (11) is not activated and that causes the actuator (11) to stop if it is activated.

* * * * *